(12) United States Patent
Hill (10) Patent No.: US 12,228,248 B2
(45) Date of Patent: Feb. 18, 2025

(54) INTERNAL NOZZLE FOR A TANK CAR (71) Applicant: Trinity Tank Car, Inc., Dallas, TX (US)

(72) Inventor: Ross E. Hill, River Oaks, TX (US)

(73) Assignee: TRINITY TANK CAR, INC., Dallas, TX (US)

( * ) Notice: Subject to any disclaimer, the term of this patent is extended or adjusted under 35 U.S.C. 154(b) by 1072 days.

(21) Appl. No.: 17/150,198

(22) Filed: Jan. 15, 2021

(65) Prior Publication Data

US 2021/0222833 A1 Jul. 22, 2021

Related U.S. Application Data

(60) Provisional application No. 62/962,594, filed on Jan. 17, 2020.

(51) Int. Cl.
*F17C 13/00* (2006.01)
*B61D 5/02* (2006.01)
(Continued)

(52) U.S. Cl.
CPC .............. *F17C 13/001* (2013.01); *B61D 5/02* (2013.01); *B61D 5/04* (2013.01); *F17C 3/08* (2013.01); *F17C 13/005* (2013.01); *F17C 2201/0109* (2013.01); *F17C 2201/054* (2013.01); *F17C 2203/0391* (2013.01); *F17C 2203/0629* (2013.01); *F17C 2205/0352* (2013.01);
(Continued)

(58) Field of Classification Search
CPC ...... F17C 2201/0109; F17C 2223/0161; F17C 2201/054; F17C 2223/033; F17C 2203/0391; F17C 2203/0629; F17C 3/08; F17C 13/005; F17C 13/001; F17C 2205/0352; F17C 2221/011; F17C 2221/012; F17C 2221/014; F17C 2221/033; F17C 2270/0173
See application file for complete search history.

(56) References Cited

U.S. PATENT DOCUMENTS 2,767,962 A * 10/1956 Blackburn ............ B65D 90/022
220/592.12
3,078,004 A * 2/1963 Randolph .............. B61D 5/008
280/832
(Continued)

OTHER PUBLICATIONS

Office Action issued by the Canadian Intellectual Property Office for Application No. 3, 105,833—Mar. 13, 2024.

*Primary Examiner* — S. Joseph Morano
*Assistant Examiner* — Cheng Lin
(74) *Attorney, Agent, or Firm* — Baker Botts L.L.P.

(57) ABSTRACT

A cryogenic railway tank car includes an outer tank, an inner tank positioned within the outer tank, an internal nozzle, and a pipe. The inner tank includes a shell that defines an opening. The internal nozzle is coupled to the inner tank at least along a perimeter of the opening and extends in a radial direction through the opening and into the inner tank. A space defined by an interior surface of the outer tank, an exterior surface of the inner tank, and an interior surface of the nozzle is configured to hold a vacuum. The pipe is configured to transport the fluid between an exterior of the outer tank and the interior of the inner tank. At least a portion of the pipe extends from the outer tank to the inner tank through at least a portion of the nozzle.

14 Claims, 7 Drawing Sheets

(51) Int. Cl.
*B65D 88/74* (2006.01)
*F17C 3/08* (2006.01)

(52) U.S. Cl.
CPC ... *F17C 2209/232* (2013.01); *F17C 2221/011* (2013.01); *F17C 2221/012* (2013.01); *F17C 2221/014* (2013.01); *F17C 2221/033* (2013.01); *F17C 2223/0161* (2013.01); *F17C 2223/033* (2013.01); *F17C 2270/0173* (2013.01)

(56) References Cited

U.S. PATENT DOCUMENTS

| | | | | | |
|---|---|---|---|---|---|
| 3,326,141 | A | * | 6/1967 | Graves | B61D 5/04 |
| | | | | | 280/832 |
| 3,602,003 | A | * | 8/1971 | Hampton | F17C 13/005 |
| | | | | | 220/592.2 |
| 3,698,200 | A | * | 10/1972 | Johnson | F17C 3/08 |
| | | | | | 220/592.27 |
| 4,579,249 | A | * | 4/1986 | Patterson | B60P 3/22 |
| | | | | | 220/560.12 |
| 4,960,222 | A | * | 10/1990 | Fields, III | B65D 90/24 |
| | | | | | 220/571 |
| 8,403,000 | B2 | * | 3/2013 | Adkins | F17C 13/00 |
| | | | | | 62/50.1 |
| 2008/0209917 | A1 | * | 9/2008 | Adler | F17C 3/00 |
| | | | | | 137/511 |

\* cited by examiner

INTERNAL NOZZLE FOR A TANK CAR

RELATED APPLICATIONS

This application claims priority to U.S. Provisional Application Ser. No. 62/962,594 entitled "INTERNAL NOZZLE FOR A TANK CAR," filed Jan. 17, 2020, the entire content of which is incorporated herein by reference.

TECHNICAL FIELD OF THE INVENTION

This disclosure relates generally to railcars, and more particularly to an internal nozzle for use in a cryogenic tank car constructed using a tank within a tank design.

BACKGROUND

Railroad tank cars are used to transport a variety of fluid commodities over large distances. While traditional tank cars typically include a tank wrapped in insulation and covered in a protective jacket, specialized tank cars also exist. For example, cryogenic tank cars have been designed to transport cryogenic liquids (e.g., liquid nitrogen, liquid hydrogen, liquid oxygen, liquid methane, etc.). Such tank cars typically include an inner tank positioned within an outer tank. A vacuum is applied to the annular space between the two tanks to provide insulation to the commodity transported within the inner tank.

SUMMARY

According to an embodiment, a cryogenic railway tank car includes an outer tank, an inner tank positioned within the outer tank, an internal nozzle, and a first pipe. The inner tank includes a shell that is generally cylindrical in shape, a first tank head, and a second tank head. The shell includes a first open end, a second open end opposite the first open end, and a side that defines at least a first opening. The first tank head is coupled to the shell at the first open end. The second tank head is coupled to the shell at the second open end. The internal nozzle is coupled to the inner tank at least along a perimeter of the first opening. The internal nozzle extends in a radial direction through the first opening and into at least a portion of an interior of the inner tank. A first space defined by an interior surface of the outer tank, an exterior surface of the inner tank, and an interior surface of the nozzle is configured to hold a vacuum. A second space located within the inner tank and defined by an interior surface of the inner tank and an exterior surface of the nozzle is configured to hold a fluid. The first pipe is configured to transport the fluid from at least one of an exterior of the outer tank to the interior of the inner tank and the interior of the inner tank to the exterior of the outer tank. At least a portion of the first pipe extends from the outer tank to the inner tank through at least a portion of the nozzle.

According to another embodiment, a method of manufacturing a cryogenic railway tank car includes forming an inner tank system. The inner tank system includes an inner tank, an internal nozzle, and a first pipe. The inner tank includes a shell that is generally cylindrical in shape, a first tank head, and a second tank head. The shell includes a first open end, a second open end opposite the first open end, and a side that defines at least a first opening. The first tank head is coupled to the shell at the first open end. The second tank head is coupled to the shell at the second open end. The internal nozzle is coupled to the inner tank at least along a perimeter of the first opening. The internal nozzle extends in a radial direction through the first opening and into at least a portion of an interior of the inner tank. At least a portion of the first pipe is located within the internal nozzle. The method also includes enclosing the inner tank system within an outer tank such that a first space defined by an interior surface of the outer tank, an exterior surface of the inner tank, and an interior surface of the nozzle is configured to hold a vacuum. A second space located within the inner tank and defined by an interior surface of the inner tank and an exterior surface of the nozzle is configured to hold a fluid. The first pipe is configured to transport the fluid from at least one of an exterior of the outer tank to the interior of the inner tank, and the interior of the inner tank to the exterior of the outer tank. The method additionally includes applying a vacuum to the first space.

According to a further embodiment, a cryogenic railway tank car includes an outer tank, an inner tank positioned within the outer tank, and a pipe. The outer tank includes an outer shell that is generally cylindrical in shape, a first outer tank head, and a second outer tank head. The outer shell includes a first open end, and a second open end opposite the first open end. The first outer tank head is coupled to the outer shell at the first open end of the outer shell. The second outer tank head is coupled to the outer shell at the second open end of the outer shell. The inner tank is positioned within the outer tank. The inner tank includes an inner shell that is generally cylindrical in shape, a first inner tank head, and a second inner tank head. The inner shell includes a first open end, and a second open end opposite the first open end. The first inner tank head is coupled to the inner shell at the first open end of the inner shell, and is generally curved in a direction away from the first outer tank and toward an interior of the inner tank. The second inner tank head is coupled to the inner shell at the second open end of the inner shell. A space defined by an interior surface of the outer tank and an exterior surface of the inner tank is configured to hold a vacuum. The pipe is configured to transport fluid from at least one of an exterior of the outer tank to an interior of the inner tank and the interior of the inner tank to the exterior of the outer tank. The pipe enters the outer tank through the first outer tank head.

Certain embodiments of the internal nozzle may provide one or more technical advantages. For example, an embodiment helps to minimize heat transfer into the inner tank of a cryogenic tank car by providing sufficient space to house a suitable number of liquid and vapor traps. As another example, an embodiment increases the per unit length capacity of a cryogenic tank car by reducing the annular clearance needed when nesting the inner tank within the outer tank. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Railway tank cars are used to transport a variety of fluid commodities over large distances. Traditional tank cars typically include a metal tank, wrapped in an insulating material, and covered in a protective outer jacket. These traditional tank cars may be suitable for transporting liquids such as oil or ethanol. However, when the commodity to be transported within the tank car is a cryogenic liquid (e.g., liquid nitrogen, liquid hydrogen, liquid oxygen, liquid methane, etc.), the insulation offered by a traditional car may not be sufficient to maintain the commodity at the low temperatures characteristic of such liquids. Accordingly, cryogenic tank cars have been designed to transport these commodities. Such tank cars typically include a thin inner tank positioned within a thicker outer tank. A vacuum applied to the annular space between the two tanks is used to provide a high degree of insulation to the commodity held within the inner tank, enabling the tank car to haul extremely low temperature commodities over large distances, while helping to minimize heat leakage into the inner tank.

Commodity is typically loaded/unloaded into/from cryogenic tank cars through piping that penetrates the tanks. For example, pipes may enter the outer tank through one or more nozzles protruding through the side(s) and/or end(s) of the outer tank. This piping may then pass through the annular space between the outer tank and the inner tank and couple to the inner tank, thereby enabling fluid to travel from the exterior of the outer tank into the interior of the inner tank. However, because of the temperature gradient between the outer tank and the inner tank, pipes cannot travel directly (e.g., along the minimum distance in the radial direction between the shells of the tanks, or along the minimum distance between adjacent tank heads of the inner and outer tanks) from the outer tank to the inner tank, without potentially transferring significant heat to the inner tank. Accordingly, the piping found in traditional cryogenic tank cars typically includes long sections of pipes, as well as liquid and vapor traps, located within the annular spaces between the outer tanks and the inner tanks. While this additional piping helps to minimize the transfer of heat from the outer tank into the inner tank, the need to accommodate the piping within the annular space between the two tanks places limits on the total size (and accordingly, the capacity) of the inner tank. This is especially true for piping that enters through the side, rather than the end, of the tank car.

This disclosure contemplates an internal nozzle that addresses one or more of the above issues. The internal nozzle extends either part of the way or all of the way through the inner tank, thereby increasing the volume of vacuum that exists between the outer tank and the inner tank. Piping, including liquid and vapor traps, may be housed within the internal nozzle, as opposed to being wrapped around the outside of the inner tank (in the annular space between the inner and outer tanks). Accordingly, the presence of the internal nozzle reduces the annular clearance necessary when nesting the inner tank within the outer tank, potentially increasing the capacity per unit length of the tank car.

Embodiments of the present disclosure and its advantages are best understood by referring to FIGS. 1 through 5 of the drawings, like numerals being used for like and corresponding parts of the various drawings. Additional information is disclosed in U.S. patent application Ser. No. 17/150,277 entitled, "Welded Nozzle for a Tank Car"; and U.S. patent application Ser. No. 17/150,353 entitled, "Manway Relief for a Tank Car", which are both hereby incorporated by reference herein as if reproduced in their entirety. A railroad tank car is used throughout this disclosure as an example, but the ideas presented herein may apply to other cryogenic liquid storage tanks, including storage tanks for use on other types of vehicles or vessels.

Figure 1:
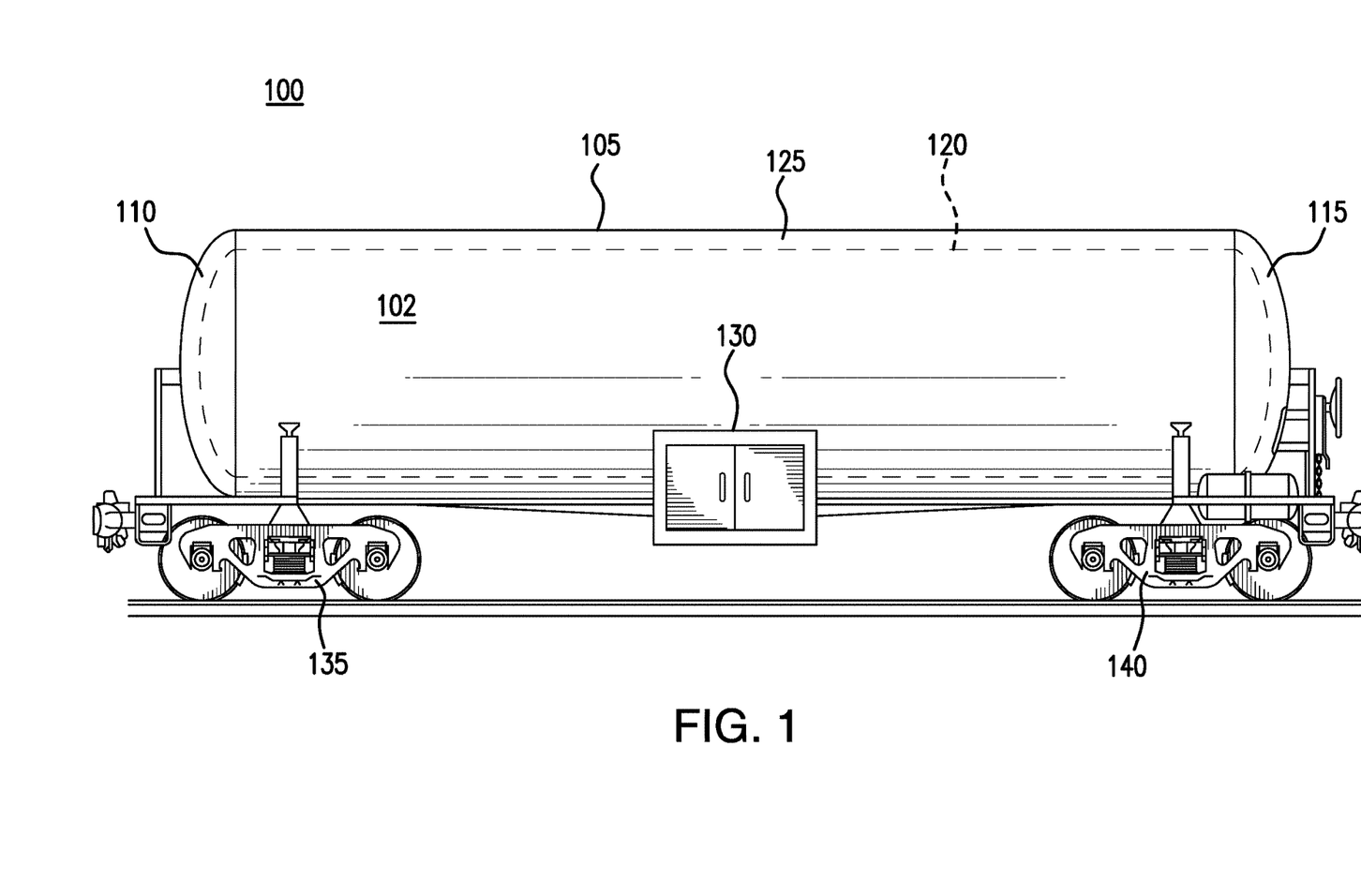
FIG. 1 illustrates an example cryogenic tank car.

FIG. 1 illustrates an example cryogenic tank car 100. Cryogenic tank car 100 includes storage tank 102 mounted on wheel assemblies 135 and 140. Storage tank 102 is generally configured to store a cryogenic liquid, such as methane, nitrogen, hydrogen, oxygen, and/or any other liquefied gas. Storage tank 102 includes a generally elongated hollow cylinder, enclosed at a first end by tank head 110 and at a second end by tank head 115. This disclosure contemplates that storage tank 102 may be of any suitable diameter and length.

As illustrated in FIG. 1, storage tank 102 may be a dual-walled cryogenic tank equipped with a vacuum jacket. For example, storage tank 102 may include outer tank 105 and inner tank 120 positioned within outer tank 105. Inner tank 102 is configured to hold fluid. Outer tank 105 and inner tank 120 may be formed from any suitable material or combination of materials. For example, outer tank 105 and inner tank 120 may be formed from steel, or any other suitable metal. In some embodiments, outer tank 105 may be formed from a different material than inner tank 120. In certain embodiments, the thickness of outer tank 105 is greater than the thickness of inner tank 120.

The exterior surface of inner tank 120 and the interior surface of outer tank 105 define annular space 125. Annular space 125 may be configured to hold a vacuum. For example, annular space 125 may be sealed off from the exterior of outer tank 105 and the interior of inner tank 120, such that air from the exterior of outer tank 105 and/or fluid from the interior of inner tank 120 may not enter annular space 125. A vacuum may be established in annular space 125 using one or more vacuum pumps, or by any other suitable means. Once the vacuum is established, it may be used to provide insulation to the contents of inner tank 120, by minimizing the transfer of heat from outer tank 105 to inner tank 120.

Storage tank 102 may include piping circuits to load/unload commodity into/out of storage tank 102. For example, storage tank 102 may include a spray header, a sparger, a vent circuit, a fill and drain circuit, any other piping circuit, any other suitable component, and/or any number and combination of the preceding. Valves and/or fittings may be mounted on storage tank 102, to control the loading and unloading of commodities to and from storage tank 102. Such valves and/or fittings may be mounted at any location on storage tank 102. As an example, in certain embodiments, the valves and/or fittings may be mounted on a side of storage tank 102 and housed inside cabinet 130. As another example, in certain embodiments, the valves and/or fittings may be mounted on one or both of tank heads 110 and 115. As a further example, in some embodiments, the valves and/or fittings may be mounted on the top of and/or the bottom of storage tank 102.

Figure 2A:
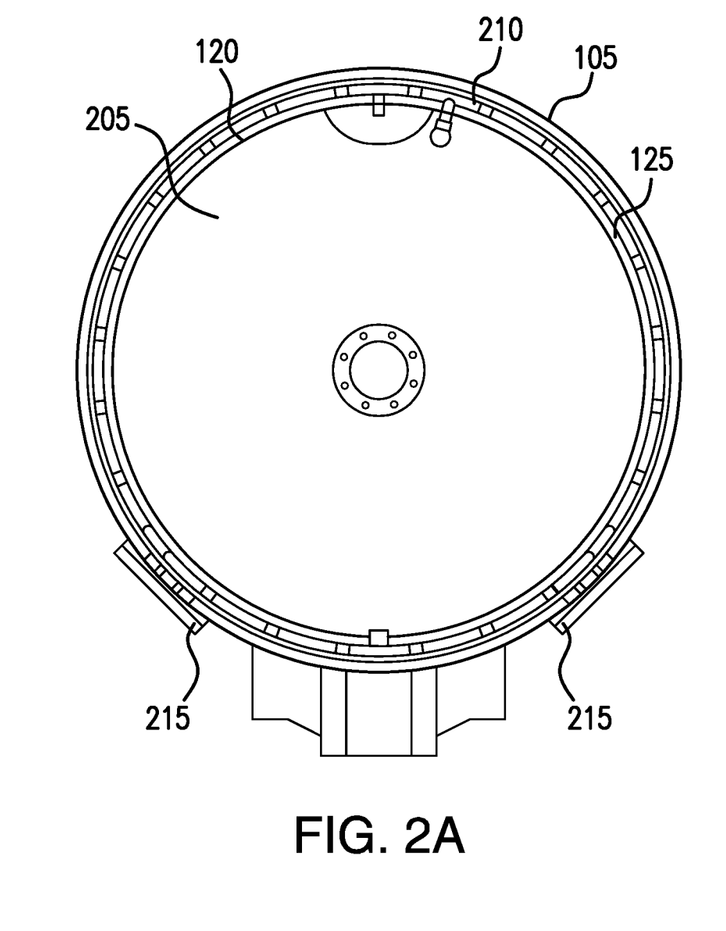
FIGS. 2A through 2C illustrate example conventional piping systems used to load/unload fluid from the cryogenic tank car of FIG. 1.
Figure 2B:
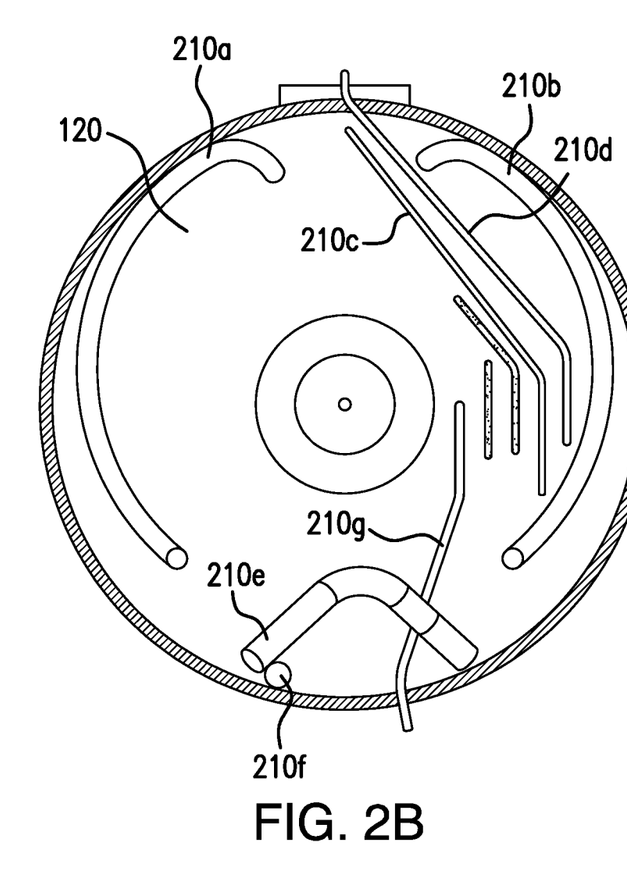
Figure 2C:
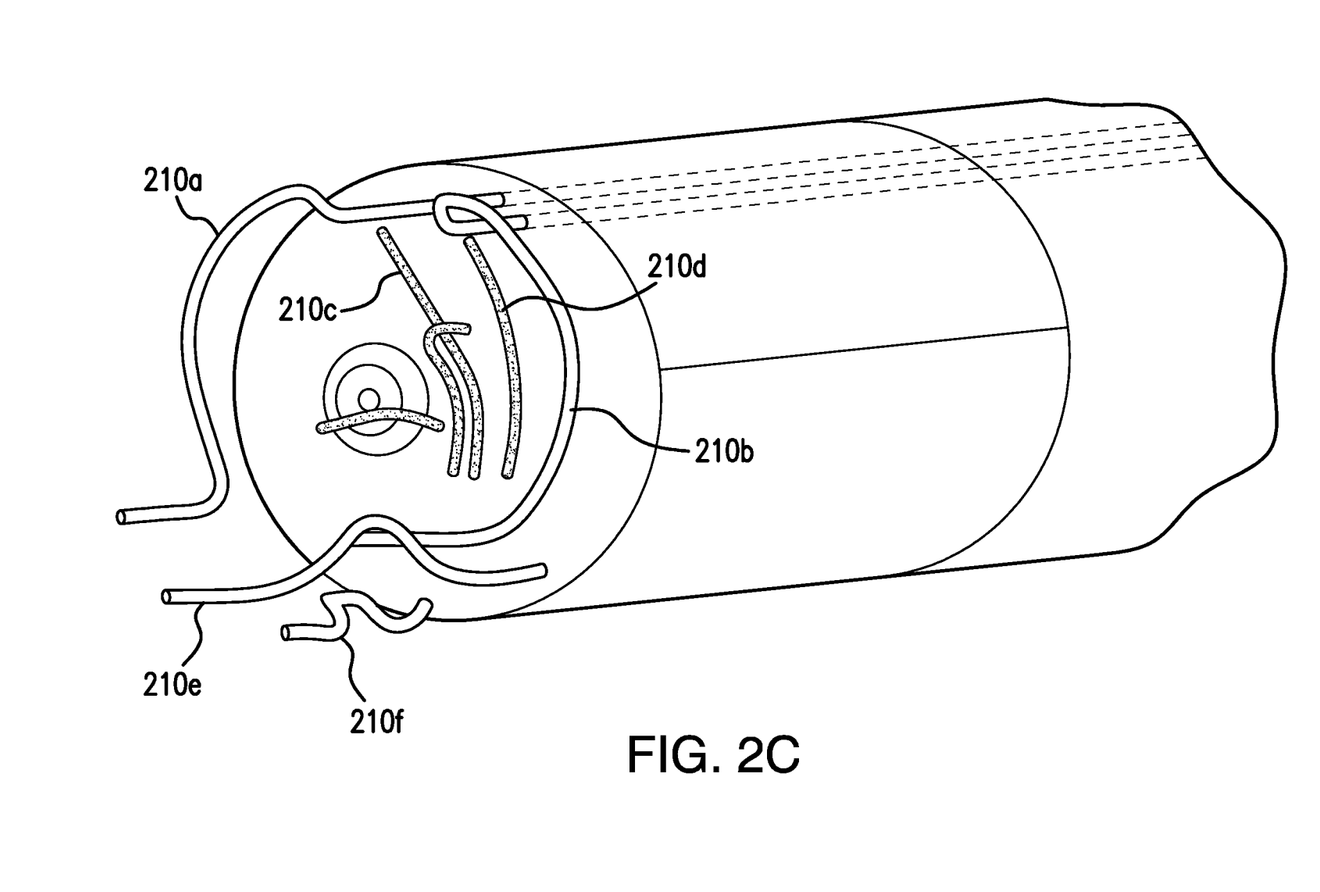

FIGS. 2A through 2C illustrate example conventional piping systems used to load/unload fluid from cryogenic tank car 100. In particular, FIGS. 2A through 2C illustrate piping 210 traveling within annular space 125, after entering through outer tank 105. FIG. 2A illustrates an embodiment in which piping 210 enters annular space 125 through nozzles 215 installed on outer tank 105, while FIGS. 2B and 2C present a head-on and a side view, respectively, of an embodiment in which piping 210 enters annular space 125 through tank head 110 and/or 115.

As illustrated in FIG. 2A, in conventional cryogenic tank cars 100, piping 210 that enters annular space 125 through the side of outer tank 105 (as opposed to tank head 110 and/or 115 of outer tank 105), typically wraps around inner tank 120 as opposed to directly entering inner tank 120. Piping 210 typically includes a number of vapor and/or liquid traps located within annular space 125. The length of piping 210 wrapped around inner tank 120 as well as the vapor and/or liquid traps housed within annular space 125 help to prevent a transfer of heat from outer tank 105 into the interior 205 of inner tank 120, which may otherwise arise due to the fact that outer tank 105 and inner tank 120 are typically at very different temperatures. Accommodating such piping within annular space 125, however, places limits on the maximum size of inner tank 120 that may be placed within a given outer tank 120.

As illustrated in FIGS. 2B and 2C, rather than entering through the center and/or side of outer tank 105, in certain embodiments of conventional cryogenic tanks 100, piping 210 may enter the space between inner tank 120 and outer tank 105 through tank head 110 and/or 115. Piping 210 may include any number of pipes 210a through 210g. Pipes 210a through 210g may include any piping suitable to fill inner tank 120 with fluid, remove fluid from inner tank 120, determine the fill level of inner tank 120, and/or perform any other suitable actions. This disclosure contemplates that pipes 210a through 210g may include any suitable number of vapor and/or liquid traps. In such embodiments, rather than wrapping around inner tank 120, piping 210 (including vapor and/or liquid traps) may be contained within the space between the inner head of outer tank 105 and the tank head of inner tank 120. However, given that this space is limited, the extent of piping 210 (including liquid and/or vapor traps) that may be housed within this space may be less than ideal to maximally prevent any heat transfer from occurring between outer tank 105 and inner tank 120.

Figure 3A:
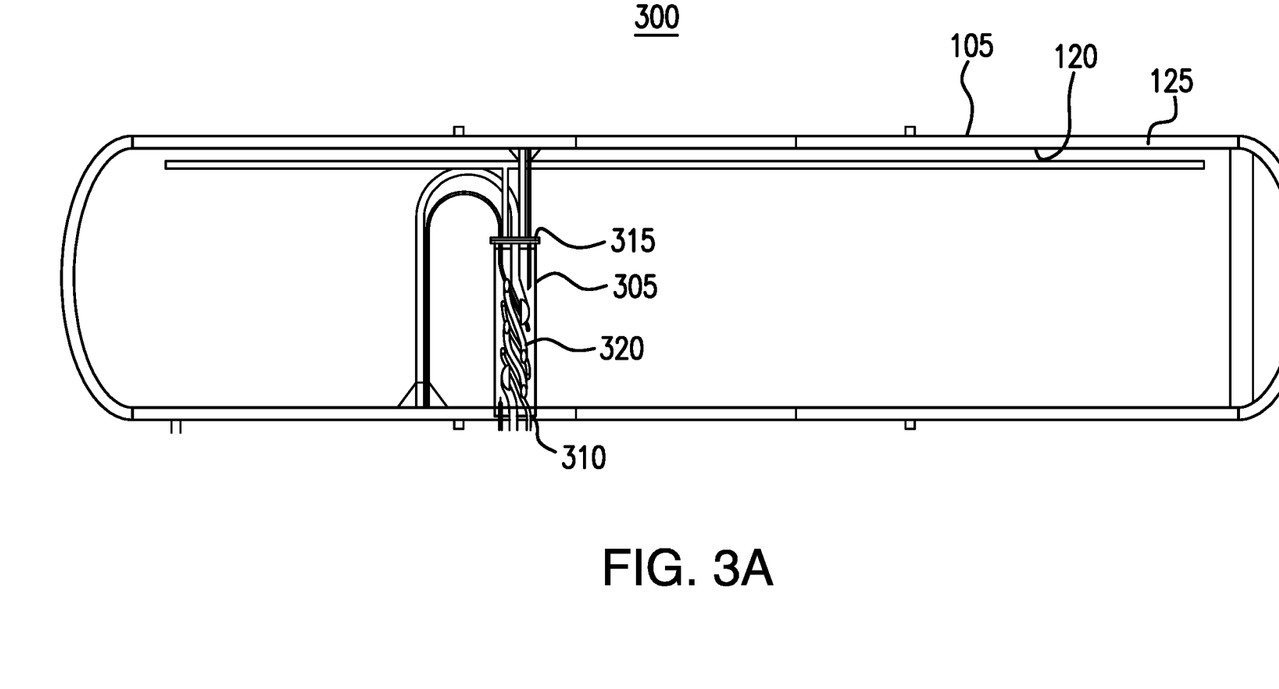
FIGS. 3A and 3B illustrate an example embodiment of the internal nozzle of the present disclosure, which extends part of the way through the inner tank of the cryogenic tank car of FIG. 1.
Figure 3B:
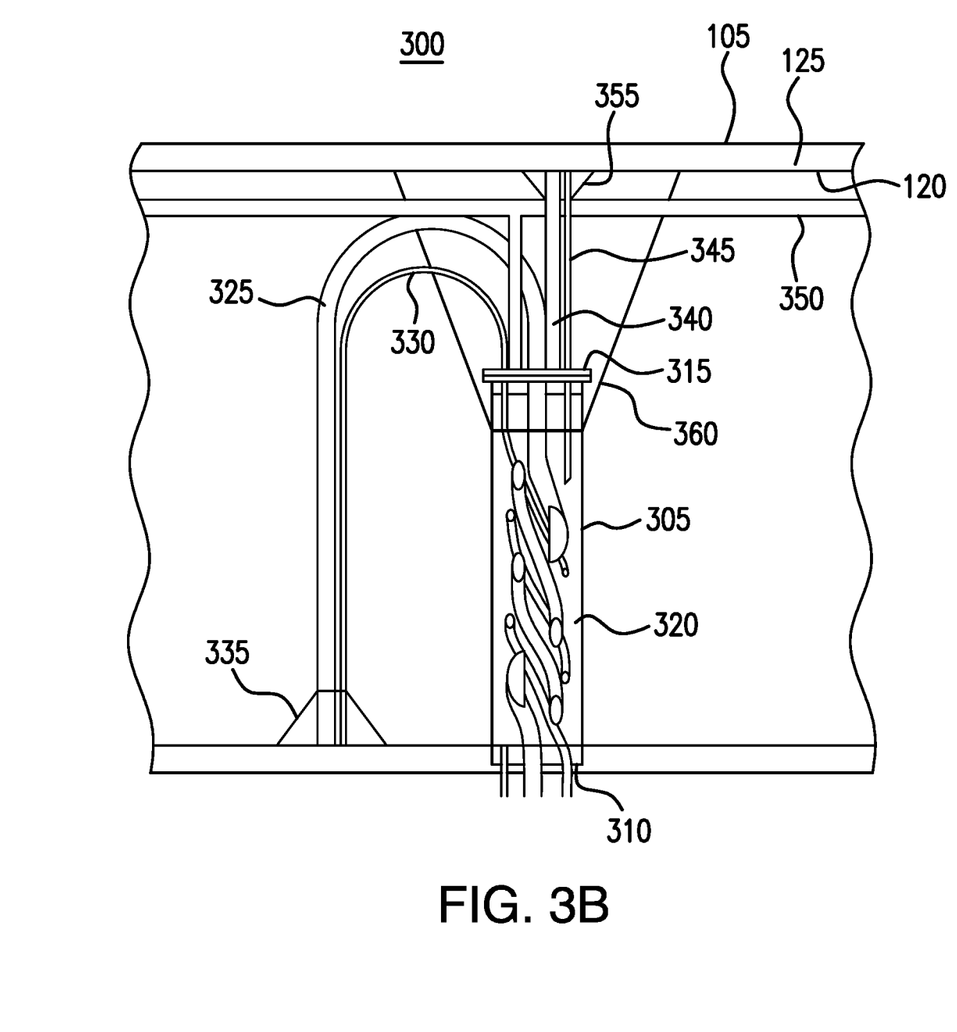
Figure 4:
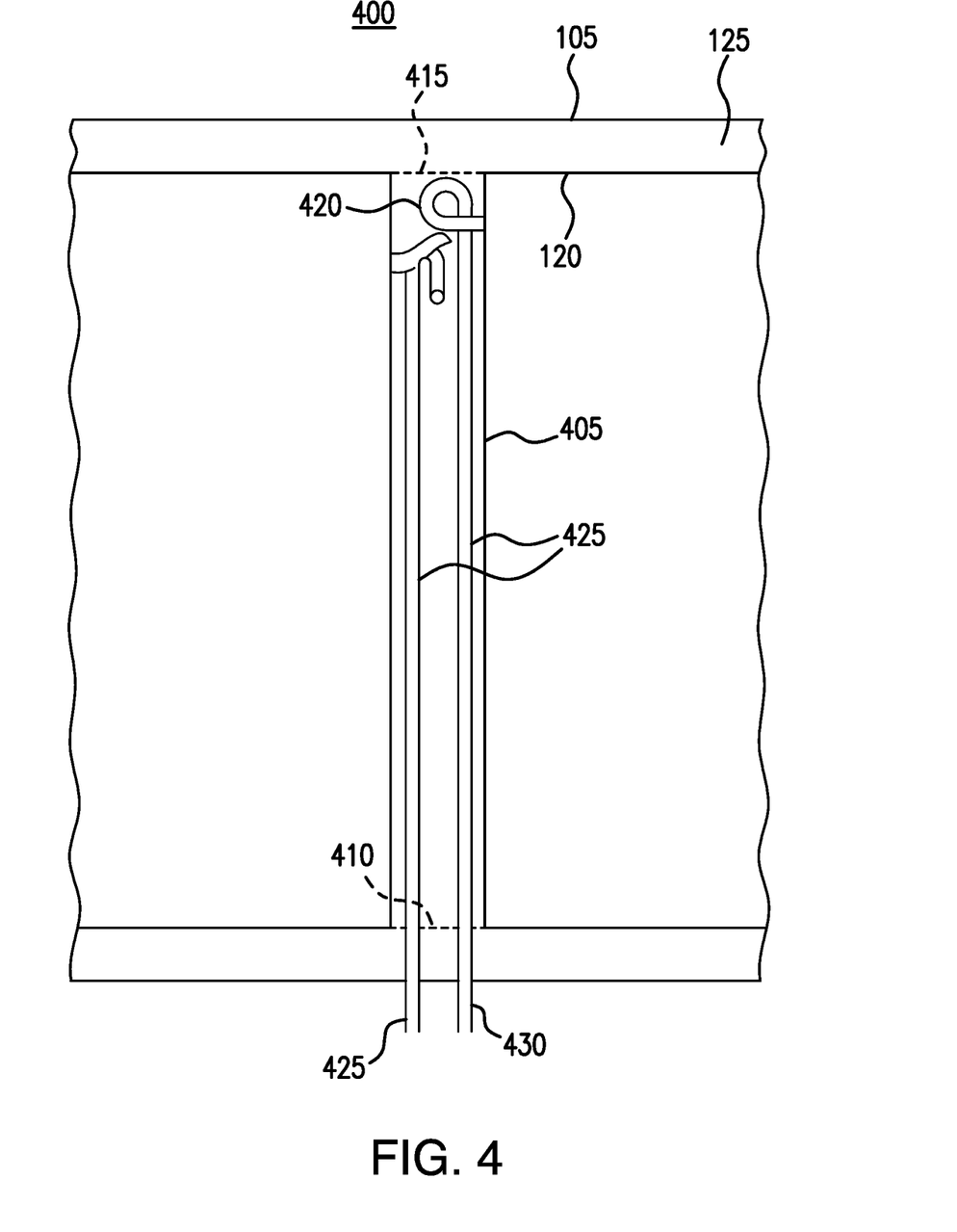
FIG. 4 illustrates an example embodiment of the internal nozzle of the present disclosure, which extends all the way through the inner tank of the cryogenic tank car of FIG. 1.

This disclosure contemplates the use of an internal nozzle that extends either part of the way or all of the way through inner tank 120, thereby providing a volume of space under vacuum that exists between outer tank 105 and inner tank 120 in addition to the annular space the is present in conventional cryogenic tanks. FIGS. 3A and 3B illustrate an example embodiment of internal nozzle 305, which extends part of the way through inner tank 120, while FIG. 4 illustrates an example embodiment of internal nozzle 405 that extends all of the way through inner tank 120.

FIG. 3A presents a cross-section of storage tank 102, illustrating an example placement of internal nozzle 305 within inner tank 120. Internal nozzle 305 may be formed from a hollow cylindrical pipe or other suitable tube. A first end 310 of internal nozzle 305 defines an opening on inner tank 120 and provides access to the interior space of internal nozzle 305. The interior space of internal nozzle 305 is surrounded by inner tank 120 and separated from inner tank 120 by the cylindrical pipe of internal nozzle 305. In certain embodiments, first edge 310 may be flush with the surface of inner tank 120. In some embodiments, first edge 310 may extend through the opening on inner tank 120 and a distance into annular space 125.

As illustrated in FIG. 3A, in certain embodiments, second end 315 of internal nozzle 305 may terminate within inner tank 120. In such embodiments, second end 315 may generally be closed (apart from piping 320 protruding through second end 315 and entering the interior of inner tank 120). Accordingly, the interior space of internal nozzle 305 may be open to annular space 125 and closed off from inner tank 120, such that when a vacuum is generated within annular space 125 the vacuum is also generated within the interior space of internal nozzle 305. In this manner, internal nozzle 305 may provide space to house piping 320, after piping 320 has entered annular space 125 but prior to the piping entering inner tank 120. Thus, the use of internal nozzle 305 may help to prevent heat from transferring between outer tank 105 and inner tank 120, without wrapping piping 320 around inner tank 120, in annular space 125, as is common in traditional cryogenic tank cars 100.

In certain embodiments, an external nozzle and/or fittings plate may be installed on outer tank 105. Piping 320 may then enter annular space 125 from outer tank 105, through such nozzle and/or fittings plate. This disclosure contemplates that such a nozzle/fittings plate may be installed on outer tank 105 at a location directly adjacent to the location of first end 310 of internal nozzle 305. In this manner, piping 320 may pass directly through outer tank 105 and into internal nozzle 305, without winding around inner tank 120. This disclosure also contemplates that first end 310 of internal nozzle 305 may be positioned on inner tank 120 at any location along inner tank 120. For example, first end 310 may be positioned on a side of inner tank 120, at the top of inner tank 120, and/or at the bottom of inner tank 120. Internal nozzle 305 may then extend in a radial direction through inner tank 120.

FIG. 3B presents a close-up view of internal nozzle 305, illustrated in FIG. 3A. As illustrated in FIG. 3B, piping 320 enters storage tank 102 through outer tank 105, passes directly through annular space 125, enters first end 310 of internal nozzle 305, and is housed within internal nozzle 305, prior to entering inner tank 120.

This disclosure contemplates that any number of pipes may enter storage tank 102 to form piping 320. For example, as illustrated in FIG. 3B, piping 320 may include bottom fill and/or liquid withdrawal line 325, high-pressure gauge line 330, low-pressure gauge line 345, vapor recovery and/or safety vent line 340, and spray header line 350. Bottom fill and/or liquid withdrawal line 325 is used to fill up inner tank 120 from the bottom of the tank and/or to remove fluid from the bottom of inner tank 120. High-pressure gauge line 330 and low-pressure gauge line 340 may be used together to determine the fullness of inner tank 120. In particular, a liquid-level gauge may use the differential pressures of high-pressure gauge line 330 and low-pressure gauge line 340 to determine the fullness of inner tank 120. Vapor recovery and/or safety vent line 345 is used to prevent an over pressurization of inner tank 120. For example, while filling inner tank 120, vapor may be recovered from the top of inner tank 120 using vapor recovery line 345. Additionally, vapor recovery line 345 may also be tied into a safety valve, such that if inner tank 120 over pressurizes on its own, the safety valve will release, venting vapor into the atmosphere until the pressure within inner tank 120 drops below the value which triggers the release of the safety valve.

Spray header line 350 may be used in conjunction with bottom fill line 325, when filling inner tank 120. The top of spray header line 350 extends axially along a length of inner tank 120 and includes a plurality of holes drilled into the line, up and down its length. Such holes are typically aimed at the top and sides of inner tank 120 and are used to spray commodity onto the interior surface of inner tank 120. The commodity may then run down the sides of inner tank 120, cooling the interior surface of inner tank 120. This helps to prevent warping of inner tank 120 that may otherwise occur if simply loading cold commodity into inner tank 120 through bottom fill line 325. This disclosure contemplates that in certain embodiments, piping 320 may enter inner tank 120 through second end 315 of internal nozzle 305. In some embodiments, piping 320 may enter inner tank 120 through a side of internal nozzle 305.

As illustrated in FIG. 3B, the interior of inner tank 120 may include a number of alignment guides 335 and 355, used to brace piping that has entered inner tank 120 through nozzle 305. For example, alignment guide 335 may be used to brace bottom fill and/or liquid withdrawal line 325 and high-pressure gauge line 330. As another example, alignment guide 355 may be used to brace low-pressure gauge line 340 and vapor recovery and/or safety vent line 345. Alignment guides 335 and 355 may be used to secure piping within inner tank 120 and to prevent such piping from swinging side to side like a pendulum (e.g., when storage tank 102 is transported over the rail). This disclosure contemplates that alignment guides 335 and 355 may have any suitable shape and configuration and may be welded to an interior surface of inner tank 120.

In certain embodiments, the interior of inner tank 120 may also include one or more alignment guides 360 attached to nozzle 305 and used to brace nozzle 305 within inner tank 120, thereby helping to prevent nozzle 305 from moving within inner tank 120. Such guides may be particularly useful in embodiments in which nozzle 305 does not extend all the way through inner tank 120, as illustrated in FIGS. 3A and 3B. This disclosure contemplates that alignment guide 360 may have any suitable shape and configuration. For example, in certain embodiments, alignment guide 360 may be a triangular-shaped guide. In certain embodiments, and as illustrated in FIG. 3B, alignment guide 360 may be welded to, and extend from, a location on the interior surface of inner tank 120, diametrically opposite to the opening on the surface of inner tank 120, defined by first end 310 of internal nozzle 305. In some embodiments, alignment guide 360 may be welded to, and extend from, a location on the same side of interior surface of inner tank 120 as the opening defined by first edge 310 of internal nozzle 305.

As illustrated in FIGS. 3A and 3B, the pipes 320, housed within internal nozzle 305, may twist around one another. This may increase the total length of piping 320 within internal nozzle 305 (as compared with straight piping), thereby spreading the temperature gradient (arising from the large difference in temperature between outer tank 105 and inner tank 120) over a larger distance and potentially reducing the amount of heat transferred into inner tank 120. This disclosure contemplates that piping 320 may twist within internal nozzle 305 in any suitable manner. In addition, the amount of twisting may depend on the length of internal nozzle 305 within inner tank 120. For example, a shorter internal nozzle 305 may include more twisting of piping 320 than a longer internal nozzle 305. This disclosure contemplates that nozzle 305 may be of any suitable length. For example, internal nozzle 305 may extend part of the way or all the way through inner tank 120. Additionally, nozzle 305 may be of any suitable diameter. For example, nozzle 305 may be formed from a cylindrical pipe of eighteen inches in diameter.

While not illustrated in FIGS. 3A and 3B, piping 320, housed within internal nozzle 305, may include one or more liquid and/or vapor traps. This may be desirable, because the fluid in inner tank 120 may be in a state of equalization, in which gas and liquid are constantly changing states, condensing and evaporating within inner tank 120. Accordingly, gas may condense on the piping within inner tank 120. Without liquid and/or vapor traps, such condensation may run down the piping and into the space enclosed by internal nozzle 305, where, as it gets closer and closer to the warm outer tank 105, it may begin to boil off, creating a heat leak. The presence of liquid and/or vapor traps within internal nozzle 305 may prevent such a heat leak, by trapping the condensation before it runs down towards warm outer tank 105.

FIG. 4 illustrates an example embodiment of internal nozzle 405, which extends all the way through inner tank 120. In particular, FIG. 4 presents a cross-section of storage tank 102, illustrating an example placement of internal nozzle 405 within inner tank 120. As described above, internal nozzle 405 may be formed from a hollow cylindrical pipe or other suitable tube. A first edge 410 of internal nozzle 405 defines an opening on the surface of inner tank 120 and provides access to the interior space of internal nozzle 405. Similarly, a second edge 415, located at an opposite end of internal nozzle 405 from first edge 410, defines an opening on the surface of inner tank 120, at a location on the surface of inner tank 120 diametrically opposite the location of the opening defined by first edge 410, and provides access to the interior space of internal nozzle 405. In certain embodiments, first edge 410 may be flush with the surface of inner tank 120. Similarly, second edge 415 may be flush with the surface of inner tank 120. In some embodiments, first edge 410 and/or second edge 415 may extend a distance into annular space 125.

The interior space of internal nozzle 405 is surrounded by inner tank 120 and separated from inner tank 120 by the cylindrical pipe of internal nozzle 405. Accordingly, the interior space of internal nozzle 405 may be open to annular space 125 at both ends of internal nozzle 405 and closed off from inner tank 120 by the cylindrical pipe of internal nozzle 405, such that when a vacuum is generated within annular space 125 the vacuum is also generated within the interior space of internal nozzle 405. In this manner, internal nozzle 405 may provide space to house piping 425, after piping 425 has entered annular space 125 but prior to the piping entering inner tank 120, to help prevent heat transfer from occurring between outer tank 105 to inner tank 120. Thus, the use of internal nozzle 405 may help to prevent heat from transferring between outer tank 105 and inner tank 120, without wrapping piping 425 around inner tank 120, in annular space 125, as is common in traditional cryogenic tank cars 100.

Piping 425 may enter internal nozzle 405 from annular space 125 through first end 410 and/or second end 415. After travelling a distance through internal nozzle 405, piping 425 may then enter inner tank 120 through the side of internal nozzle 405. This disclosure contemplates that any number of pipes may enter storage tank 102 to form piping 425. For example, piping 425 may include a bottom fill and/or liquid withdrawal line, a high-pressure gauge line, a low-pressure gauge line, a vapor recovery and/or safety vent line, and/or a spray header line 350.

As illustrated in FIG. 4, piping 425 housed within internal nozzle 405 may include one or more vapor and/or liquid traps 420. Additionally, pipes 425 may twist around one another within internal nozzle 405, thereby increasing the total length of piping housed within internal nozzle 405, as compared to straight piping. Because internal nozzle 405 extends all the way through inner tank 120, internal nozzle 405 may provide a greater volume of vacuum within storage tank 102, as compared with internal nozzle 305, which extends only part of the way through inner tank 120. Accordingly, piping 425, housed within internal nozzle 405, may include fewer twists as compared with piping 320, housed within internal nozzle 305, because internal nozzle 405 may accommodate a greater total length of piping 425, as compared with internal nozzle 305.

This disclosure contemplates that cryogenic storage tank 102 may include any number of internal nozzles 305 and/or 405. The use of internal nozzles 305 and/or 405 may provide a greater volume of vacuum between inner tank 120 and outer tank 105 to house vapor and/or liquid traps, as compared with annular space 125 in conventional cryogenic storage tanks 102. Not only may this help to reduce a transfer of heat from outer tank 105 to inner tank 120, by housing piping 320 and/or 425 within internal nozzle 305 and/or 405, as opposed to within annular space 125, certain embodiments may reduce the annular clearance necessary for nesting inner tank 120 within outer tank 105. Accordingly, certain embodiments may increase the per length capacity of inner tank 120.

While discussed in terms of an internal nozzle extending through inner tank 120, this disclosure contemplates that any means may be used to increase the volume of vacuum that may be included within storage tank 102 (and thereby the room within which to house piping and liquid/vapor traps), without reducing the radial extent of inner tank 120 and/or allowing for a larger radial extent of inner tank 120 as compared with conventional cryogenic tank cars. As an example, in certain embodiments, a reverse tank head may be included at one or both ends of inner tank 120, thereby creating additional vacuum space at one or both ends of storage tank 102. For example, the inner tank head illustrated in FIG. 2B may be curved towards the interior of inner tank 120. In this manner, a greater volume of space may exist between this inner tank head and outer tank head 110/115, as compared to conventional cryogenic tank cars. In this manner, certain embodiments may accommodate a longer length of piping 210a through 210g within the volume of space between the tank head of inner tank 120 and outer tank head 110/115 as compared with a conventional cryogenic tank (that otherwise is of the same dimensions). As another example, in certain embodiments, tank head 110 and/or 115 of outer tank 105 may extend outward, further than in conventional tank cars, and to a greater degree than the tank heads on inner tank 120, thereby creating additional vacuum space at one or both ends of storage tank 102. For example, tank head 110 and/or tank head 115 may be somewhat conical in shape. As a further example, any shape of indentation may be included in inner tank 120 (e.g., on the side of inner tank 120, on one or more tank heads of inner tank 120), to create additional vacuum space to house piping and/or liquid/vapor traps.

Figure 5:
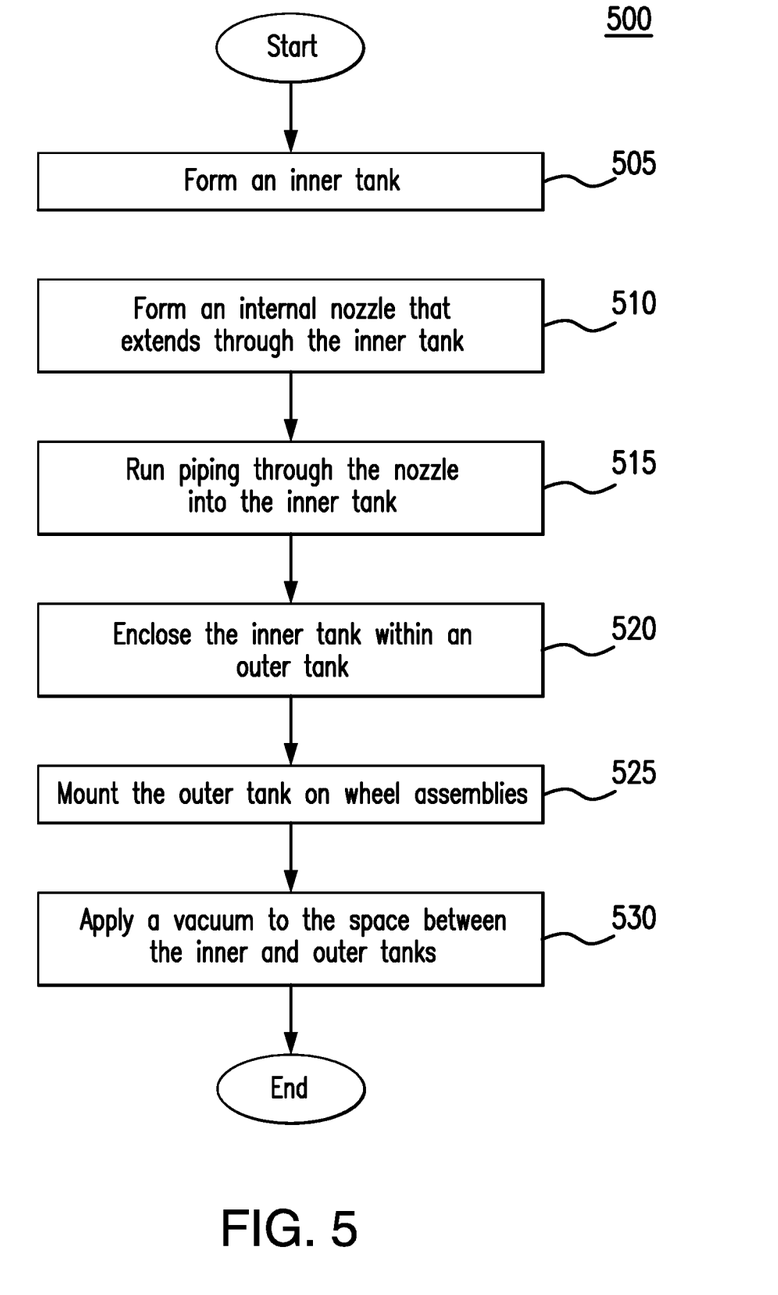
FIG. 5 presents a flow chart illustrating an example method by which a cryogenic tank car that includes an internal nozzle, as illustrated, for example, in FIGS. 3A and 3B or FIG. 4, may be manufactured.

FIG. 5 presents a flowchart illustrating an example method by which a cryogenic tank car 100 that includes internal nozzle 305/405 may be manufactured. In step 505, inner tank 120 is formed. Inner tank 120 may be formed from any suitable material. For example, in certain embodiments, inner tank 120 is formed from metal. In step 510 internal nozzle 305/405 is formed and coupled to inner tank 120. Internal nozzle 305/405 may be any suitable size or shape and may be formed from any suitable material. For example, in certain embodiments, internal nozzle 305/405 is formed from a cylindrical pipe. In some embodiments, steps 505 and 510 are combined, such that forming inner tank 120 includes integrally forming nozzle 305/405 within inner tank 120. In some embodiments, internal nozzle 305/405 is added to an existing inner tank 120. For example, one or more openings may be created on the surface of inner tank 120, through which internal nozzle 305/405 may be inserted. For instance, in embodiments that include internal nozzle 305, the nozzle may be inserted through an opening on the surface of inner tank 120, such that first end 310 of internal nozzle 305 is flush with the surface of inner tank 120 around the opening, or first end 310 of internal nozzle 305 extends past the surface of inner tank 120 (as illustrated, for example, in FIG. 3B). First end 310 of internal nozzle 305 may then be coupled to the surface of inner tank 120. For example, first end 310 of internal nozzle 305 may be welded to the surface of inner tank 120 around the opening on inner tank 120 defined by first end 310. In embodiments that include internal nozzle 405, two openings may be created on the surface of inner tank 120 (defined by the intersections 410 and 415 of internal nozzle 405 with internal tank 120). Internal nozzle 405 may be inserted into inner tank 120 through either of these openings, such that first end 410 and/or second end 415 of internal nozzle 405 is flush with the surface of inner tank 120 (as illustrated, for example, in FIG. 4) and/or first end 410 and/or second end 415 of internal nozzle extends past the surface of inner tank 120. First end 410 and second end 415 may then be coupled to the surface of inner tank 120. For example, first end 410 of internal nozzle 405 may be welded to the surface of inner tank 120 around the opening on inner tank 120 defined by first end 410, and second end 415 of internal nozzle 405 may similarly be welded to the surface of inner tank 120 around the opening on inner tank 120 defined by second end 415.

In step 515 piping 320/425 is added to internal nozzle 305/405. Piping 320/425 is configured to transport fluid into/out of the interior of inner tank 120 through internal nozzle 305/405. In certain embodiments, piping 320/425 includes one or more liquid and/or vapor traps 420. In some embodiments, piping 320/425 may include multiple twists and/or turns such that a greater length of piping may be housed within internal nozzle 305/405 as compared with the use of straight piping. In certain embodiments, piping 320/425 may be added to internal nozzle 305/405 prior to the placement of internal nozzle 305/405 within inner tank 120. In certain embodiments, piping 320/425 may enter inner tank 120 through a side of internal nozzle 305/405 (as illustrated, for example, in FIG. 4). In some embodiments, piping 320/405 may enter inner tank 120 through second end 315 of internal nozzle (as illustrated, for example, in FIGS. 3A and 3B).

In step 520 inner tank 120 is enclosed within outer tank 105, such that a volume of space defined by the inner surface of outer tank 105, the outer surface of inner tank 120, and the interior space of inner nozzle 305/405 is sealed off from both the interior of inner tank 120 and the exterior of outer tank 105. In certain embodiments, enclosing inner tank 120 within outer tank 105 includes passing piping 320/425 through one or more external nozzles located on the surface of outer tank 105 (e.g., one or more nozzles 215, as illustrated in FIG. 2A) and/or connecting piping 320/425 to one or more fittings located on the surface of outer tank 105. One or more fittings plates may then be installed on the external nozzle(s).

In step 525 the cryogenic tank formed from inner tank 120 and outer tank 105 is installed on wheel assemblies 135 and 140 to form cryogenic tank car 100. In step 530 vacuum is applied to the volume enclosed between outer tank 105 and inner tank 120.

Modifications, additions, or omissions may be made to method 500 depicted in FIG. 5. Method 500 may include more, fewer, or other steps. For example, steps may be performed in parallel or in any suitable order. One or more steps may be performed by an individual, a machine, any other device, or a combination of the preceding.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A cryogenic railway tank car comprising:
   an outer tank;
   an inner tank positioned within the outer tank, the inner tank comprising:
      a shell that is generally cylindrical in shape, the shell comprising a first open end, a second open end opposite the first open end, and a side that defines at least a first opening;
      a first tank head coupled to the shell at the first open end; and
      a second tank head coupled to the shell at the second open end:
   an internal nozzle coupled to the inner tank at least along a perimeter of the first opening, the internal nozzle extending in a radial direction through the first opening and into at least a portion of an interior of the inner tank, wherein:
      a first space defined by an interior surface of the outer tank, an exterior surface of the inner tank, and an interior surface of the nozzle is configured to hold a vacuum;
      a second space located within the inner tank and defined by an interior surface of the inner tank and an exterior surface of the nozzle is configured to hold a fluid:
   a first pipe configured to transport the fluid from at least one of an exterior of the outer tank to the interior of the inner tank and the interior of the inner tank to the exterior of the outer tank, wherein at least a portion of the first pipe extends from the outer tank to the inner tank through at least a portion of the nozzle;
   a first end of the internal nozzle terminates within the inner tank; and
   a second end of the internal nozzle terminates within the first space, the second end of the internal nozzle opposite the first end of the internal nozzle.

2. The cryogenic railway tank car of claim 1, wherein:
   the side of the shell further defines a second opening;
   the internal nozzle extends through a diameter of the inner tank; and
   the internal nozzle is further coupled to the inner tank along a perimeter of the second opening.

3. The cryogenic railway tank car of claim 2, wherein the first pipe enters the inner tank through a side of the internal nozzle.

4. The cryogenic railway tank car of claim 1, wherein the first pipe enters the inner tank through the first end of the internal nozzle.

5. The cryogenic railway tank car of claim 1, further comprising a brace coupled to the internal nozzle, wherein:
   the brace is housed within the inner tank; and
   the brace is configured to support the internal nozzle in a generally upright position within the inner tank.

6. The cryogenic railway tank car of claim 1, wherein the first pipe comprises at least one of a liquid trap and a vapor trap, the at least one of the liquid trap and the vapor trap housed within the internal nozzle.

7. The cryogenic railway tank car of claim 1, further comprising a second pipe, wherein:
   at least a portion of the second pipe extends from the outer tank to the inner tank through at least a portion of the internal nozzle; and
   the portion of the second pipe and the portion of the first pipe twist around one another within the internal nozzle.

8. A method of manufacturing a cryogenic railway tank car comprising:
   forming an inner tank system, the inner tank system comprising:
      an inner tank comprising:
         a shell that is generally cylindrical in shape, the shell comprising a first open end, a second open end opposite the first open end, and a side that defines at least a first opening:
         a first tank head coupled to the shell at the first open end; and
         a second tank head coupled to the shell at the second open end:
      an internal nozzle coupled to the inner tank at least along a perimeter of the first opening, wherein the internal nozzle extends in a radial direction through the first opening and into at least a portion of an interior of the inner tank; and
      a first pipe, wherein at least a portion of the first pipe is located within the internal nozzle;
   enclosing the inner tank system within an outer tank, wherein:
      a first space defined by an interior surface of the outer tank, an exterior surface of the inner tank, and an interior surface of the nozzle is configured to hold a vacuum;
      a second space located within the inner tank and defined by an interior surface of the inner tank and an exterior surface of the nozzle is configured to hold a fluid; and
      the first pipe is configured to transport the fluid from at least one of an exterior of the outer tank to the interior of the inner tank, and the interior of the inner tank to the exterior of the outer tank;
      a first end of the internal nozzle terminates within the inner tank;
      a second end of the internal nozzle terminates within the first space, the second end of the internal nozzle opposite the first end of the internal nozzle; and
   applying a vacuum to the first space.

9. The method of claim 8, wherein:
   the side of the shell further defines a second opening;
   the internal nozzle extends through a diameter of the inner tank; and
   the internal nozzle is further coupled to the inner tank along a perimeter of the second opening.

10. The method of claim 9, wherein the first pipe enters the inner tank through a side of the internal nozzle.

11. The cryogenic railway tank car of claim 8, wherein the first pipe enters the inner tank through the first end of the internal nozzle.

12. The cryogenic railway tank car of claim 8, wherein the inner tank system further comprises a brace coupled to the internal nozzle, the brace configured to support the internal nozzle in a generally upright position within the inner tank.

13. The method of claim 8, wherein the first pipe comprises at least one of a liquid trap and a vapor, the at least one of the liquid trap and the vapor trap housed within the internal nozzle.

14. The method of claim 8, wherein:
   the inner tank system further comprises a second pipe, wherein at least a portion of the second pipe is located within the internal nozzle; and
   the portion of the second pipe that is located within the internal nozzle and the portion of the first pipe that is located within the internal nozzle twist around one another.

* * * * *